US009767181B2

(12) United States Patent
Whisenant (10) Patent No.: US 9,767,181 B2
(45) Date of Patent: Sep. 19, 2017

(54) EXTENDING A DATABASE RECOVERY POINT AT A DISASTER RECOVERY SITE

(75) Inventor: James L. Whisenant, Austin, TX (US)

(73) Assignee: BMC Software, Inc., Houston, TX (US)

( * ) Notice: Subject to any disclaimer, the term of this patent is extended or adjusted under 35 U.S.C. 154(b) by 2163 days.

(21) Appl. No.: 12/628,155

(22) Filed: Nov. 30, 2009

(65) Prior Publication Data
US 2011/0131186 A1     Jun. 2, 2011

(51) Int. Cl.
| G06F 7/00 | (2006.01) |
| G06F 17/00 | (2006.01) |
| G06F 17/30 | (2006.01) |
| G06F 11/16 | (2006.01) |
| G06F 11/20 | (2006.01) |

(52) U.S. Cl.
CPC .... *G06F 17/30595* (2013.01); *G06F 11/1658* (2013.01); *G06F 11/2038* (2013.01); *G06F 11/2028* (2013.01); *G06F 11/2048* (2013.01); *G06F 2201/80* (2013.01)

(58) Field of Classification Search
CPC ............ G06F 11/1658; G06F 11/2028; G06F 11/2038; G06F 11/2048; G06F 17/30595; G06F 2201/80; G06F 11/1469; Y10S 707/99953
See application file for complete search history.

(56) References Cited

U.S. PATENT DOCUMENTS

| 5,381,545 | A | * | 1/1995 | Baker | G06F 11/1451 |
| | | | | | 707/999.202 |
| 6,092,085 | A | * | 7/2000 | Keene | G06F 11/2094 |
| 6,226,651 | B1 | * | 5/2001 | Masuda | G06F 11/1471 |
| 7,383,463 | B2 | * | 6/2008 | Hayden | G06F 11/2069 |
| | | | | | 714/4.11 |
| 7,707,455 | B2 | * | 4/2010 | Anand et al. | 714/6.12 |
| 2008/0229142 | A1 | * | 9/2008 | Anand | G06F 11/1438 |
| | | | | | 711/161 |

OTHER PUBLICATIONS

"Recovery Manager for DB2® User Guide 9.0." BMC Software, Inc. Nov. 2008. pp. 1-743.
"IBM Tools Expanded and Enhanced to Help Better Manage DB2 and IMS Environments." IMB US Software Announcement 209-219. Aug. 4, 2009. pp. 1-32.
"DB2 Recovery Expert for z/OS." IBM Corporation. Apr. 2008. pp. 1-24.
"Optimizing Restore and Recovery Solutions with DB2 Recovery Expert for z/OS v2.1." imb.com/redbooks. Jun. 2008. pp. 1-350.

* cited by examiner

*Primary Examiner* — Jason Liao
*Assistant Examiner* — Berhanu Mitiku
(74) *Attorney, Agent, or Firm* — Brake Hughes Bellermann LLP (57) ABSTRACT

A DBA may pre-generate database recovery jobs on a convenient schedule at a local site, then recover a database at a disaster recovery site. Archive log files for the database that are generated in the interim between recovery job generation and recovery job execution are automatically incorporated into the recovery job when it executes, extending the recovery point closer to the time of the disruption that triggered the need or desire for recovery.

21 Claims, 9 Drawing Sheets

EXTENDING A DATABASE RECOVERY POINT AT A DISASTER RECOVERY SITE

BACKGROUND

This disclosure relates generally to the field of computer databases. More particularly, but not by way of limitation, it relates to a technique for extending a database recovery point at a disaster recovery site.

Computer databases have been an important part of enterprises for decades. Two major types of computer databases are hierarchical databases and relational databases. Hierarchical databases, which were developed prior to relational databases, are arranged in tree-like hierarchical structures representing logical relationships. Relational databases organize data into tables of rows and columns. One common relational database management system (DBMS) is the DB2® database system marketed by International Business Machines Corporation (IBM). (DB2 is a registered trademark of IBM.)

With the increasing importance of information technology for the continuation of business critical functions, combined with a transition to an around-the-clock economy, the importance of protecting an organization's data and IT infrastructure in the event of a disruptive situation has become an increasing and more visible business priority in recent years. Backup sites are commonly established by enterprises where a copy of a database can be accessed as needed, such as when circumstances prevent access to the original database. These backup sites are commonly referred to as disaster recovery sites, because they may come into operation in the event of a natural or human-made disaster, allowing recovery of systems that are affected by the disaster.

Disaster recovery sites are typically established at some distance from the original or local site, to attempt to avoid a situation where a disaster may affect an entire area, although some enterprises may set up disaster recovery sites that are relatively nearby the local site.

Some disaster recovery sites, typically referred to as a "hot site," attempt to duplicate the original site of the organization, with full computer systems as well as near-complete backups of user data. Real time synchronization between the two sites may be used to mirror the data environment of the original site using wide area network links and specialized software. The goal of a hot site is to allow the organization to relocate operations with minimal losses to normal operations. This type of disaster recovery site is very expensive to operate, but may be necessary for organizations that operate real time processes such as financial institutions, government agencies and ecommerce providers.

Other disaster recovery sites, typically referred to as a "cold site," may provide little more than a space already configured for use in a disaster, but without any of the hardware or software that might be necessary for a recovery operation. While relatively inexpensive, a cold site may require extensive downtime to install the necessary equipment and software, in addition to the time required to restore operational data.

A "warm site" is a compromise between a hot site and a cold site. A warm site may already have hardware and software resources installed and ready for use, but typically does not mirror the local site in real time, and depends on restoring backups that may not be completely current with respect to the local site. Warm sites typically depend upon periodic backups of data. In some warm sites, the backups are physically trucked or otherwise delivered to the warm site, while in others, the backups are electronically transmitted to the warm site, at a lower cost than real-time synchronization.

In such a disaster recovery site, how current the backup is depends on how frequently the backups are performed. In some sites that use DB2 databases, the disaster recovery procedures periodically pre-generate jobs that can be run at the disaster recovery site to bring the remote database up to the time that the recovery job was generated at the local site. Transactions that occurred after the pre-generated job was created are typically logged in archive logs that could be delivered to the disaster recovery site to make the recovery site database more current, but those archive logs are not taken into account by the pre-generated job, because it was created before the additional archive logs. Thus, the database is recovered at an older state than desired. Although manual steps may be taken to add the archive log information to the recovered database, such manual steps may take long amounts of time and afford significant risks of errors, particularly in the heightened pressure of a disaster recovery event. Database administrators (DBAs) have long desired an automatic procedure that would allow recovering databases beyond the periodic pre-generated recovery point.

SUMMARY

In a first embodiment, a method of recovering a database is disclosed. The method comprises generating a database recovery job to recover a database managed at a first site, transporting the database recovery job and a recovery data to a second site, the recovery data comprising a database archive log generated after the act of generating the database recovery job, and executing the database recovery job on a computer system at the second site to recover the database at the second site to an extended recovery point corresponding to the database archive log.

In a second embodiment, a computer readable medium is disclosed. The computer readable medium has instructions for a programmable control device stored thereon, wherein the instructions cause a programmable control device to perform the method described above.

In a third embodiment, a networked computer system is disclosed. The networked computer system comprises a plurality of computers communicatively coupled, at least one of the plurality of computers programmed to perform at least a portion of the method described above wherein the entire method described above is performed collectively by the plurality of computers.

In a fourth embodiment, a method of recovering a database is disclosed. The method comprises receiving a pre-generated database recovery job; receiving a database archive log generated after the pre-generated database recovery job; and executing the pre-generated database recovery job on a computer system to recover the database to a recovery point corresponding to the database archive log.

In a fifth embodiment, a computer readable medium is disclosed. The computer readable medium has instructions for a programmable control device stored thereon, wherein the instructions cause a programmable control device to perform the method of the fourth embodiment described above.

In a third embodiment, a networked computer system is disclosed. The networked computer system comprises a plurality of computers communicatively coupled, at least one of the plurality of computers programmed to perform at least a portion of the method of the fourth embodiment described above wherein the entire method of the fourth embodiment described above is performed collectively by the plurality of computers.

DETAILED DESCRIPTION

Embodiments disclosed below provide an automatic technique for allowing disaster recovery operations of a database to extend the recovery point of a database beyond the time of a periodically pre-generated recovery job. Additional archive logs that are transported to the disaster recovery site may be automatically included in the recovery procedures, allowing the database to be recovered closer to real time without the risks associated with manual intervention. The disclosed techniques may allow enterprises to lengthen the period between generating pre-generated recovery jobs, decreasing the expense of the preparation, without increasing the lag behind real time of the recovered database.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts are understood to reference all instance of subscripts corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Although the following description is written in terms of local and disaster recovery sites that run DB2 databases, the present invention is not so limited, and the techniques described herein may be used to allow closer to real-time recovery in any database system that uses periodically created jobs that are pre-generated at a local site for execution at a disaster recovery site to recover a database at the disaster recovery site.

Figure 1:
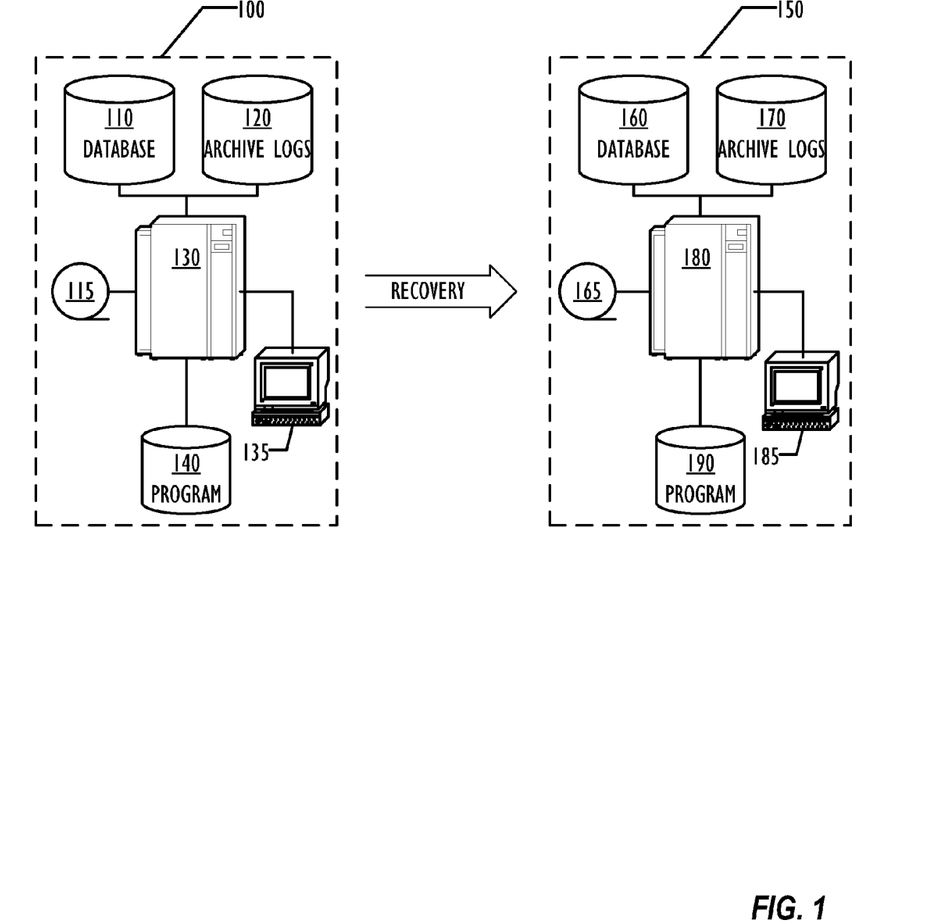
FIG. 1 illustrates, in block diagram form, an example of a local site and a disaster recovery site according to one embodiment.

FIG. 1 is a block diagram that illustrates a local site 100 and a disaster recovery site 150 according to one embodiment. Local site 100 comprises a computer system 130 that executes relational database software such as DB2 software, typically stored on disc drives such as program datastore 140, to manage a relational database stored on datastore 110. The relational database software may be a collection of database software modules, some of which may be provided by a first vendor and some of which may be provided by other vendors. In other database management systems, all of the database software is provided by a single vendor.

Data for databases managed by the DB2 software may reside in a datastore 110, and the DB2 software may create archive logs that are stored in archive log datastore 120. The archive logs contain information that may be used to restore a database to a particular point in time. Typically, the site 100 may have multiple archive logs stored in the archive log datastore 120, each covering a particular start and stop time. The start and stop time may be recorded in the archive log or elsewhere associated with the archive log, and may be an actual time value, such as a time-of-day (TOD) clock value, or some other alternate means of denoting a relative time value, such as a relative byte address (RBA) or log record sequence number (LRSN) value.

Conventional features of the computer system 130 are omitted from FIG. 1 for clarity, but one of ordinary skill in the art will understand that it comprises at least one processor and frequently more than one processor, memory, input/out devices, and storage devices, including, but not limited to, all forms of optical and magnetic storage elements including solid-state storage, including removable media for storage of programs and data. In some embodiments, it may also comprise one or more network interfaces, displays, and user interaction elements such as a keyboard, mouse, and other conventional hardware features such as devices for use with removable media. The computer system 130 is typically of a class of computers known in the art as mainframe computers, running the z/OS® operating system and the DB2 database management system software, but may be any computer capable of managing a relational database as described below. (Z/OS is a registered trademark of IBM.)

Although shown for clarity in FIG. 1 as separate units, the database datastore 110, the archive logs 120, and the program datastore 140 may be implemented in separate units or combined in one or more units known to the art as desired.

The datastore 110 providing storage for the relational database may provide storage for multiple DB2 databases and other desired data. Similarly, the archive log datastore 120 may provide storage for archive logs for multiple DB2 databases and other desired data and the program datastore 140 may provide storage for other programs other than DB2-related software.

The database datastore 110, the archive log datastore 120, and program datastore 140 may be implemented as one or more physical units or logical units allocated on physical units, and may be directly connected to the DB2 database software computer system 130 or may be remotely connected, such as via a storage area network (SAN). Databases stored on the database datastore 110 are typically stored in one or more datasets or files, but may be stored using any technique known to the art.

Data may be loaded into the database from tape unit 115 or from any other source of data, including other computer systems communicatively coupled to the computer system 130. Archive logs and other data used to create and update the disaster recovery site 150 database may be written to the tape unit 115 or other physical media for delivery to the disaster recovery site 150 in some embodiments. A database administrator (DBA) may submit a request to perform operations on databases stored in the database datastore 110 from another computer system, such as a workstation or terminal 135 communicatively coupled to the computer system 130.

Other client and server computer systems may be connected to the computer 130 to use or control databases stored in datastore 110, using any communications or operative coupling technique known to the art, but are omitted from the drawing for clarity.

For recovery in a disruption event, the disaster recovery site 150 provides a similar configuration of software and hardware. As illustrated in FIG. 1, the disaster recovery site 150 comprises a computer system 180, program datastore 190, database datastore 160, archive logs datastore 170, a tape unit 165, and a workstation 185. The disaster recovery site 150 may not be an identical configuration to the local site 100, and may comprise either fewer or more elements than the local site 100, and individual elements may be different or the same as their counterparts in the local site 100. For example, the computer system 180 may be a different model computer system than the computer system 130. A disaster recovery site 150 may be a dedicated facility for the use of the enterprise operating the local site 100, or may be a shared facility that provides disaster recovery services for multiple enterprises.

Some disaster recovery sites 150 may be owned or operated by the enterprise operating the local site 100. Other disaster recovery sites 150 may be owned or operated by third party disaster recovery site vendors, such as IBM or Sungard Data Systems, Inc. Delivery of data from the local site to the disaster recovery site may be by any means known to the art, including electronic transmission across communications links through public or private networks, as well as physical media delivery.

Figure 2:
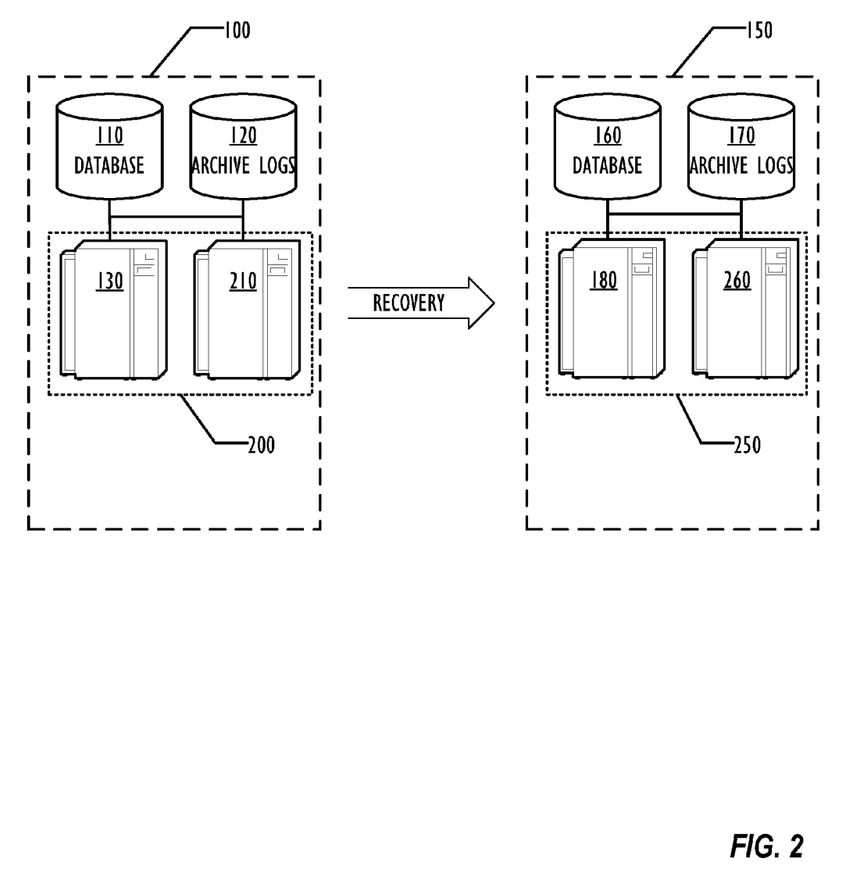
FIG. 2 illustrates, in block diagram form, an example of a local site and a disaster recovery site according to an embodiment using data sharing.

In some embodiments, the DB2 database may be shared between multiple computer systems, as illustrated in FIG. 2, in which computer systems 130 and 210 are members of a data-sharing group 200 that shares the database data stored in the database datastore 110. Similarly, at the disaster recovery site, computer systems 180 and 260 are members of a data-sharing group 250 that shares the database data stored in the database datastore 160. The computer systems 130 and 210 of data-sharing group 200, as well as the computer systems 180 and 260 of data-sharing group 250 are typically connected as a parallel sysplex system, and may be separate physical computer systems or logical partitions (LPARs) of one or more physical computer systems. In such embodiments, actions may be taken during recovery to ensure logical consistency of the databases recovered on the disaster recovery system 150. The number of members of data-sharing groups 200 and 250 illustrated in FIG. 2 are illustrative and limited to two for clarity, but data-sharing groups 200 and 250 may have any number of members as desired up to any maximum defined by the DBMS software vendor. For example, the IBM DB2 software allows for up to 32 members of a data-sharing group.

Figure 3:
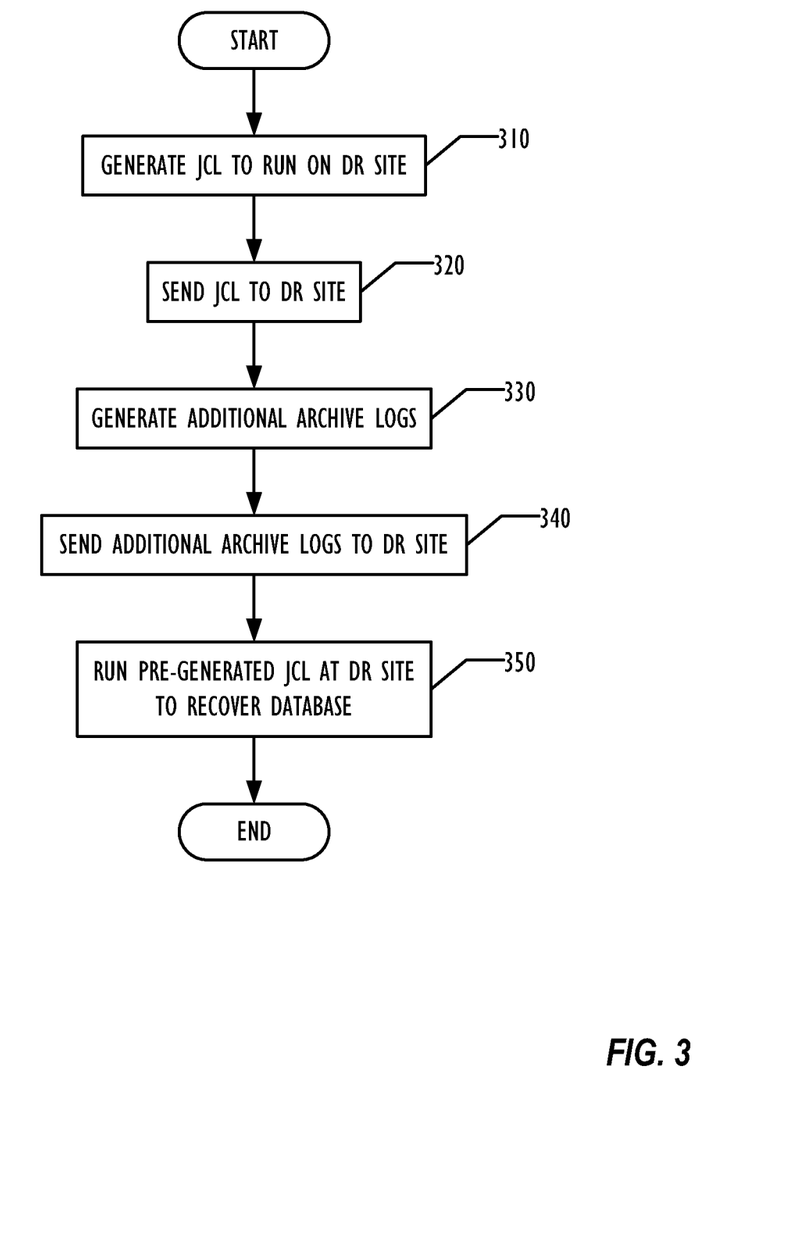
FIG. 3 illustrates, in flowchart form, an example technique for recovering a database according to one embodiment.

FIG. 3 is a flowchart illustrating a technique for recovering a database at a disaster recovery (DR) site 150 according to one embodiment. A DBA or other administrator at local site 100 using workstation 135 may run a program to generate a job to be executed at the DR site 150. The job, as well as the necessary data, is transported to the DR site 150, where the job is run on the computer system 180 to recover the database. In data-sharing embodiments such as illustrated in FIG. 2, recovery jobs may be generated to run on each of the computer systems 180 and 260 in data-sharing group 250. Reference to the recovery job in the following should be understood to refer to each of the recovery jobs in a data-sharing environment, unless otherwise indicated.

In block 310, the DBA runs the program to generate the job to run at the DR site 150. In a DB2 environment, each generated job is typically a collection of Job Control Language (JCL) statements, although in some embodiments it may be a script written in the CLIST or REXX languages. In one embodiment, the generation of the recovery job is performed by software provided by the DBMS vendor. In other embodiments, third party recovery management software may be used to generate the recovery job. One example of such a third-party recovery management software is the Recovery Manager for DB2 product of BMC Software, Inc.

In some embodiments, the job is generated by a program running on the computer system 130 at the local site 100, but in other embodiments, the job may be generated on the workstation 135. The job may be generated periodically, for example, on a daily basis. The pre-generated recovery job provides sufficient information that when run at the DR site 150, the database stored in the database datastore 160 may be recovered up to the time that the recovery job was generated.

Bringing the database back to its state at the time the recovery job was generated typically is typically insufficient, because additional transactions may occur in the interim between the time that the recovery job was generated at the local site 100 and the time that the disruption or other event occurred that triggered the need or desire to recover the database at the DR site 150. Thus, the program to create the recovery job generates additional steps that allow for recovery up to the time of the latest archive log file available to the DR site 150. In one embodiment, the generation of these additional steps may be optional, allowing the DBA to specify that no extension of the recovery point should be performed.

By allowing extension of the recovery point beyond the time of the generation of the recovery job, the disclosed techniques may allow a DBA to schedule the generation of the recovery job with less frequency, decreasing the amount of processing required at the local site 100, but without risking a loss of transactions performed after the recovery job is generated. For example, a DBA may decide to generate the recovery job weekly, instead of daily, as may have been advisable with conventional recovery jobs that did not automate recovery point extension.

In block 320, the pre-generated job is sent to the DR site 150 from the local site 100. Any convenient technique for data transport known to the art may be used, including sending and receiving physical media containing the pre-generated recovery job and the data and transactions to be recovered, as well as electronic communication of the job and data between the local site 100 and the DR site 150. As indicated above, in addition to the recovery job itself, database data and archive logs created prior to the generation of the recovery job are also transported to the DR site, for use in recovering the database. Block 320 is typically performed soon after generation of the recovery job, to attempt to minimize the amount of time necessary to begin the recovery process at the DR site when recovery is needed or desired. Block 320 may be performed at any desired time up to the time of recovering the database at the DR site 150. For example, the recovery job may be repetitively generated at the local site 100, but only received at the DR site 150 when it is to be executed to recover the database.

As explained above, between the generation of the recovery job and the disruption or other event that triggers the desire or need to recover the database at the DR site 150, additional archive logs may be created in block 330 at the local site 100, reflecting additional transactions performed in the interim that are desirably recovered. These additional archive logs are also transported to the DR site 150 and loaded into the archive log datastore 170 in block 340, for use by the recovery job, using any convenient delivery technique, physical, electronic, or otherwise.

When the database system is ready for recovery at the DR site 150, the pregenerated job is executed in block 350 to recover the database.

In a data-sharing environment, such as is illustrated in FIG. 2, a recovery job may be generated for every member of the data-sharing group 200, to allow the members of the corresponding group 250 at the DR site 150 to recover their respective views of the database. Then each computer system 180 and 260 at the DR site 150 may execute the corresponding recovery job, to recover each member of the data-sharing group, avoiding logical inconsistencies that might occur if less than all of the members were recovered.

A distinction may be made between the database from the point of view of the DBMS, such as a DB2 subsystem, and the database from the point of view of database applications. The recovery job and the techniques described herein for database recovery are related to the recovery of the database at the DBMS level. Additional work may be required to recover database applications to a desired recovery point, but that additional work is outside the scope of the present disclosure.

Figure 4:
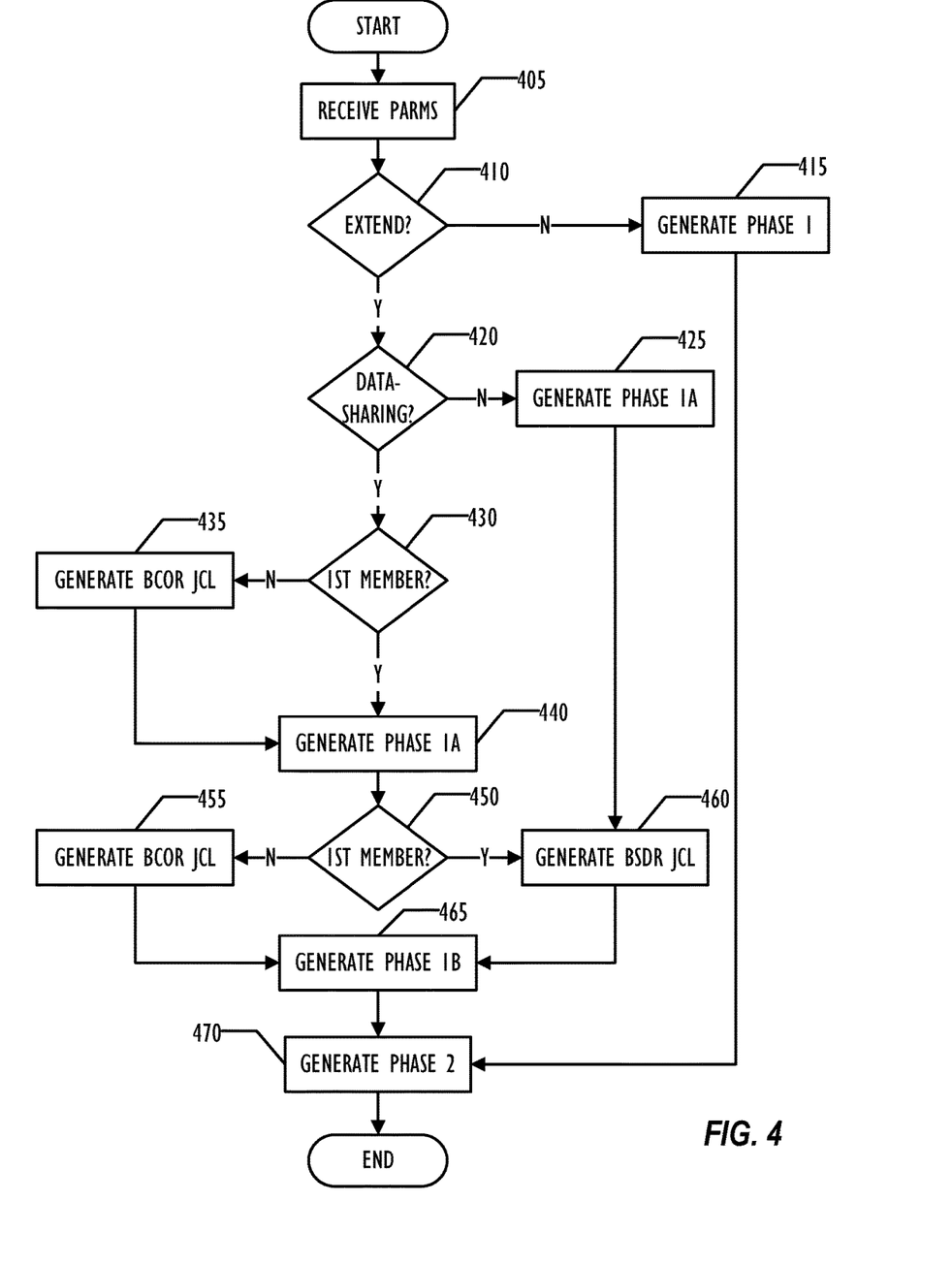
FIG. 4 illustrates, in flowchart form, an example technique for generating a job at a local site for execution at a disaster recovery site according to one embodiment.

FIG. 4 is a flowchart illustrating a technique for generating a recovery job according to one embodiment. In block 405, parameters passed to the generation program may be received. The generation program may be implemented as a single or multiple modules, and parameters may be passed to it or them in any way known to the art, including by a graphical user interface (GUI) or command line. One such parameter that may be provided may be a parameter that indicates whether recovery point extension steps should be generated in the recovery job.

In one embodiment, the recovery job is generated with multiple phases, of which may be combined into a single recovery job or split into multiple recovery jobs, as desired or convenient. A first phase may include steps to set up the recovery, while a second phase may include steps to perform the actual recovery. Additional phases may be generated as desired.

In one embodiment, the first phase may include some or all of the following steps: deleting and defining the DB2 BootStrap Data Set (BSDS), deleting and defining active logs, recovering the BSDS from a last archive, renaming archive logs in the BSDS, adding a last archive log to the BSDS, adding a conditional restart control to reset an end RBA, adding active logs to the BSDS, initializing active logs, deleting and defining catalog and directory spaces, printing a log map, deleting an existing history file, creating and initializing a new history file, performing actions for non-data-sharing coordinated recovery, and restoring archive logs to disc. In addition, the first phase may include steps for extending the recovery point.

After the first phase job executes, the second phase job may execute to perform the actual recovery. The second phase job in one embodiment may execute after the DB2 software has been restarted on the computer system 180 (and in a data-sharing group 250, also on computer system 260) in a maintenance mode. The second phase may include in one embodiment one or more of the following steps, recovering SYSUTILX data spaces, recovering SYSUTILX indices, recovering the DBD01 table space, terminating in-flight utilities, recovering the DB2 catalog and directory, recovering user catalog indices, starting a catalog or directory in read/write mode, recovering temporary work files, displaying and terminating running utilities, recovering third party vendor repository files, clearing third party vendor data, and stopping DB2. After the second phase jobs complete, the recovered DB2 may be restarted.

Returning to FIG. 4, in block 410, the parameter controlling generation of extension of the recovery point is checked. If the DBA indicated that no extension was desired, the first phase may be generated in block 415, and the second phase may be generated in block 470. If extension of the recovery point is desired, which in one embodiment is the default condition, in block 420 the generation program determines whether it is generating jobs for recovering the multi-member data-sharing group 200 or a single system.

In a non-data-sharing environment, a first part of the first phase may be generated in block 425. Steps for performing extension of the recovery point may be generated in block 460. The remaining portion of the first phase may be generated in block 465, and the second phase may be generated in block 470.

In an environment where a data-sharing group with multiple members exists, as illustrated in FIG. 2, additional steps may be generated. In one embodiment, the recovery point extension steps are performed by one member of the data-sharing group, with the other members coordinating their recovery jobs with the recovery job executed by the one member as described in more detail below.

In one embodiment, the technique for generating the recovery job illustrated in FIG. 4 may be performed for every member of the data-sharing group 200. The generation technique may determine in block 430 whether the job being generated is for a first member of the data-sharing group, using any desired technique for identifying the first member. If the job is not for the first member, a step may be generated in block 435 to run a coordination module in the recovery job. The coordination module sets up conditions that will allow the recovery of the first member to complete the recovery point extension before the recovery jobs for the other members complete their respective recovery processing. In one embodiment, the coordination module is run twice during the recovery job for all but the first member, as described in more detail below.

The coordination module may be omitted from the recovery job for the first member. The steps for a first portion of the first phase of the recovery job may be generated in block 440, regardless of the member for which the recovery job is intended.

After generating the first portion of the first phase of the recovery job, the generation technique may check again in block 450 which member is being processed. If the recovery job is being generated for the first member, in block 460 the steps for extending the recovery point may be generated. If the job is being generated for the other members, the steps for executing the coordination module may be generated in block 455.

Regardless of the member for which the recovery job is being generated, the steps for the second portion of the first phase may be generated in block 465. Finally, the steps for the second phase of the recovery job may be generated in block 470.

As indicated above recovery jobs for each member of the data-sharing group are generated using the above technique. The recovery jobs may then be transported from the local site 100 to the recovery site 150 for execution of the recovery jobs as described above.

Although not described herein, the recovery jobs generated in FIG. 4 may include any desired techniques for detecting and handling processing errors, including conditional execution of steps based on return codes and aborting execution of the recovery job.

Figure 5:
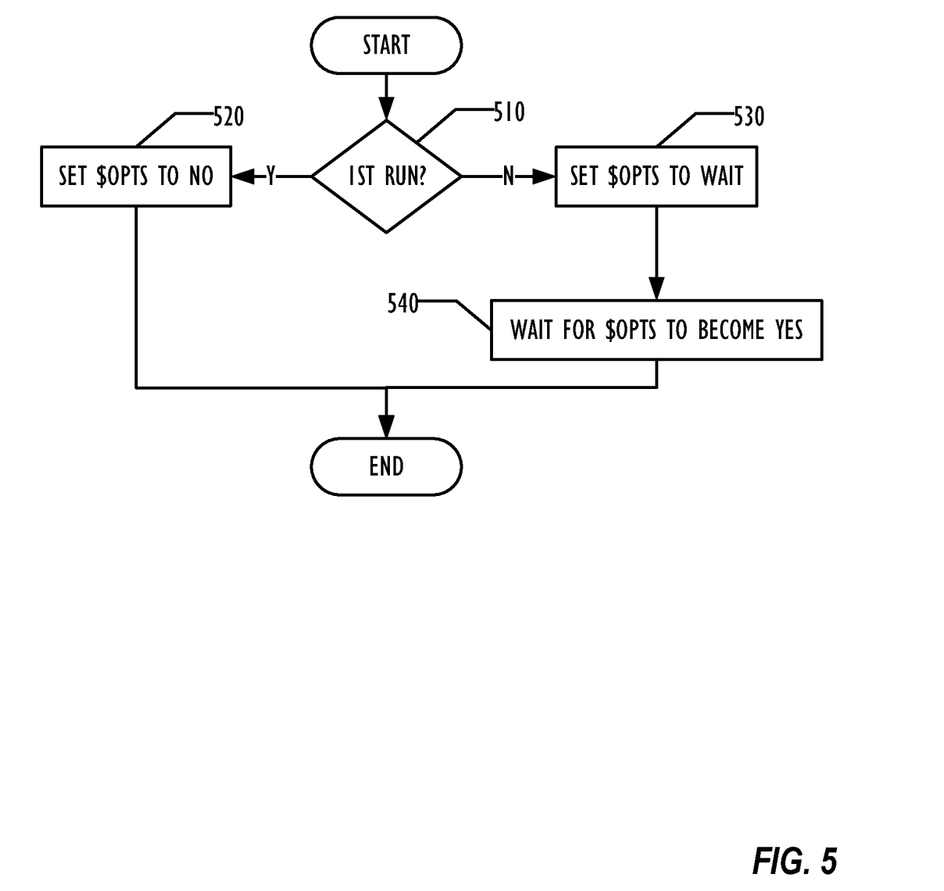
FIG. 5 illustrates, in flowchart form, an example of a technique for causing members of a data-sharing group to wait upon an event according to one embodiment.

FIG. 5 is a flowchart that illustrates one embodiment of the coordination module execution on the DR site 150 computer system 260, representing a member of the data-sharing group 250 other than the first member 180. In block 510, the module may determine whether it is being run prior to or after the first portion of the first phase has been run. This determination may be by a parameter value passed to the coordination module or any other technique known to the art. In block 520, if the coordination module is being executed prior to the first portion of the first phase, the coordination module may indicate that the coordination module has been run the first time. In one embodiment, the coordination module may set an option value of NO in an options file accessible at least to the first member of the data-sharing group, the option value indicating that the coordination module has been run the first time. The option value may be interrogated by the recovery point extension module in the first member's recovery job to signal it to wait for the other members to complete the first portion of the first phase before performing the recovery point extension.

If the coordination module determines that it is being executed after completion of the first portion of the first phase of the recovery job, it may set an indicator indicating that status in block 530. In one embodiment, where the first run of the coordination module set an option value in an options file, the second run may change that option value to a different value, such as WAIT. After setting the indicator in block 530, the coordination module may wait in block 540 for the indicator to be reset by the recovery point extension module executing in the recovery job for the first member. In one embodiment the recovery point extension module resets the indicator for a member to YES, indicating that recovery may continue for the corresponding other member.

The use of an options file accessible by the first member and the other members of the data-sharing group is illustrative and by way of example only. Any other desired technique for allowing one job to signal and coordinate with another job running in a different computer system may be used as desired.

Figure 6:
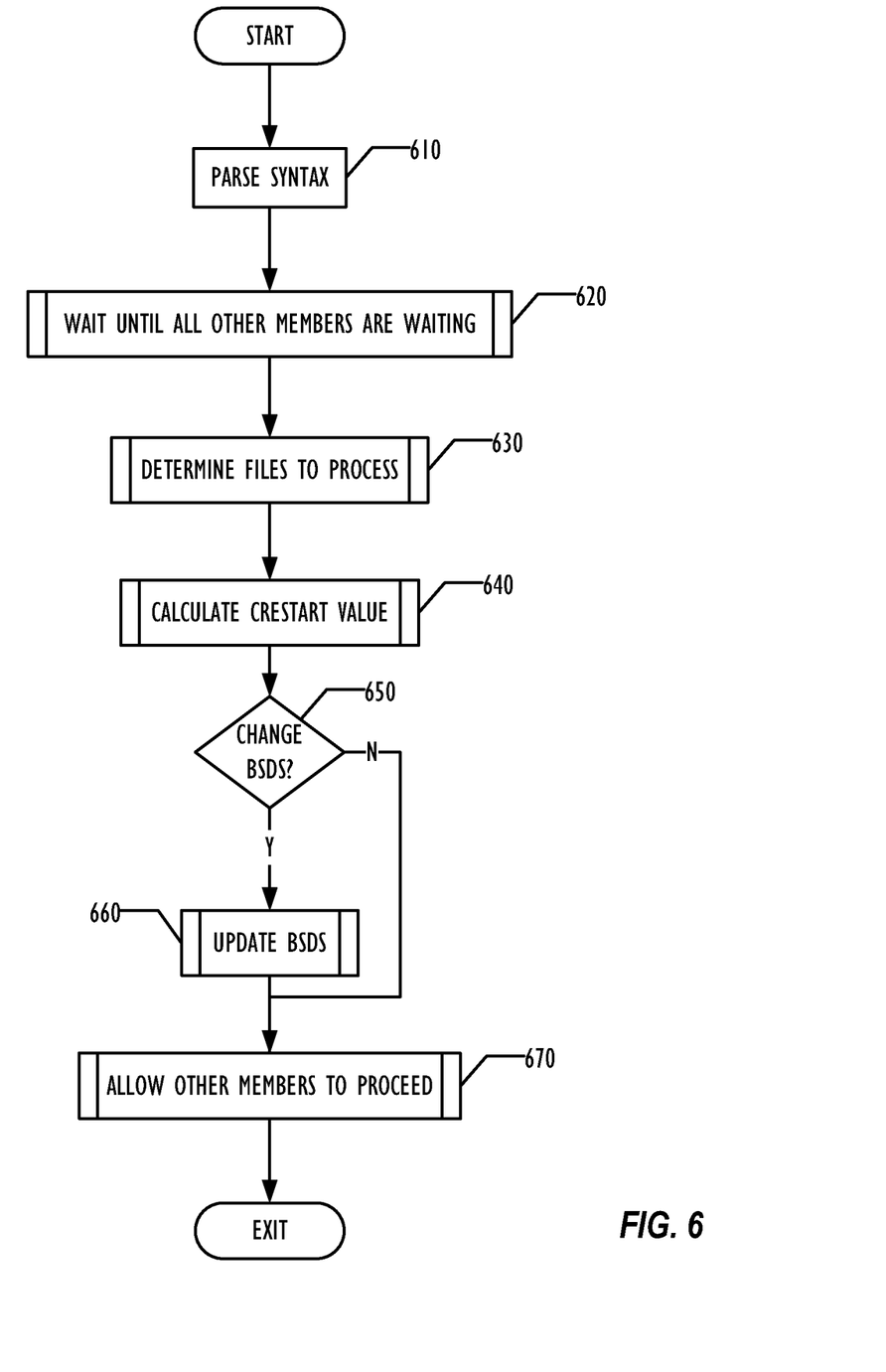
FIG. 6 illustrates, in flowchart form, an example of a technique for recovering a database at a disaster recovery site with a pre-generated recovery job according to one embodiment.

FIG. 6 is a flowchart illustrating the recovery point extension technique performed by the recovery job of the first member according to one embodiment. In block 610, parameters that are passed to the recovery point extension module may be parsed for syntax.

Figure 7:
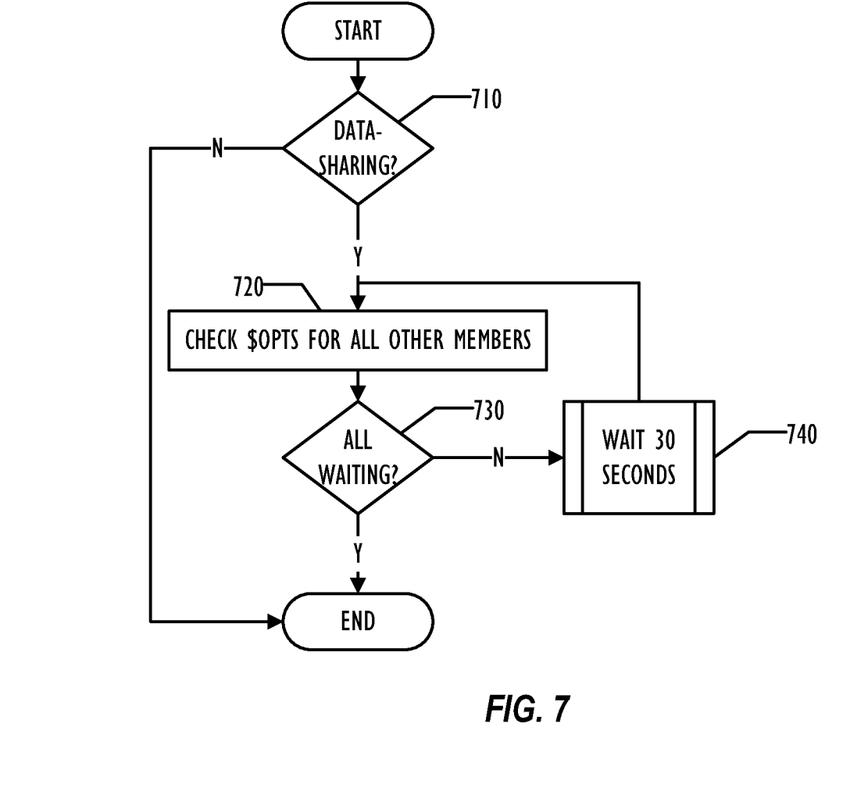
FIGS. 7-11 illustrate, in flowchart form, examples of embodiments of sub-techniques of the technique illustrated in FIG. 6.

In block 620, described in more detail in FIG. 7, the recovery point extension module may wait until all other members have signaled completion of the first portion of the first phase of recovery, indicating that all members are in a proper state for extension of the recovery point. In block 630, described in more detail in FIG. 9, the recovery extension module may determine what files it should process. In block 640, described in more detail in FIG. 10, the new recovery point may be calculated, based on the files determined in block 630.

In block 650, the recovery point extension module may determine whether any change to the BSDS to change the recovery point is desired. For example, if no archive logs were created after the generation of the recovery job, then no changes to the BSDS or the recovery point may be needed. If no changes are needed, then the recovery point is not extended and the recovery point extension module may complete, indicating no changes were made. In block 660, described in more detail in FIG. 11, the BSDS may be updated to extend the recovery point of the database to the later time calculated in block 640. After the recovery point is extended in block 660, the recovery jobs of the other members may continue. In block 670, described in more detail in FIG. 8, the recovery point extension module signals the recovery jobs of the other members to continue. After completion of the second phase steps in all members, the database may be considered recovered, and restarted to allow further processing of transactions.

FIG. 7 is a flowchart illustrating a technique for the recovery point extension module to wait until all of the other members have completed enough recovery setup to allow recovery point extension, corresponding to block 620 of FIG. 6. In block 710, if the DR system 150 is not running with multiple data-sharing members, no coordination with other members is required. If the DR system 150 is running with multiple data-sharing members, in block 720 the recovery point extension module may check for indicators generated by the coordination module in the recovery job of the other members that indicate recovery point extension may proceed. In one embodiment, such as illustrated by FIG. 5, the options file may be checked for all of the other members. In block 720, the recovery point extension module may determine if all other members are waiting on the recovery point extension module, in one embodiment indicated by having an option value set to WAIT by all of the other recovery jobs. If all other recovery jobs are waiting on the recovery point extension module as determined in block 730, then the recovery point extension may proceed. Otherwise, the recovery point extension module may wait in block 740 for a predetermined period, such as 30 seconds, before retrying the actions of blocks 720-730. The 30-second wait indicated in FIG. 7 is illustrative and by way of example only, and any technique known in the art may be used to cause the recovery point extension module to wait for the other recovery jobs to get to the desired state.

Figure 8:
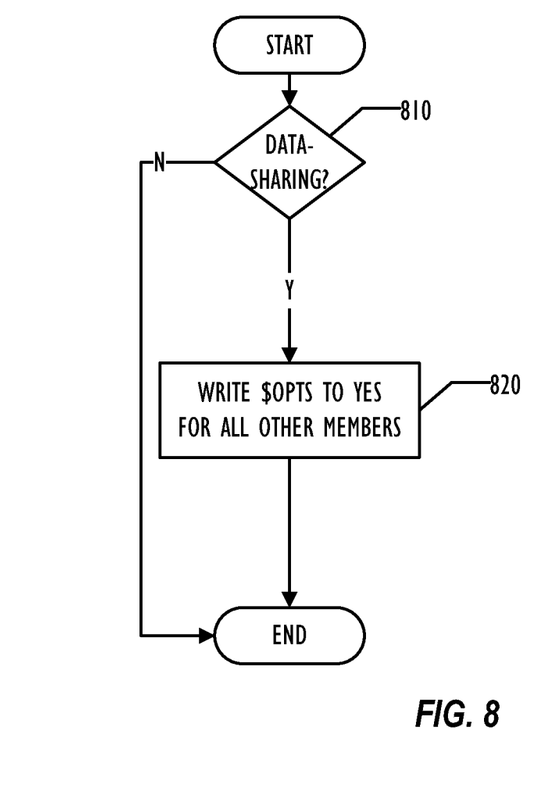

FIG. 8 is a flowchart illustrating a related technique for indicating that the recovery point extension steps of the recovery job for the first member have completed, according to one embodiment, corresponding to block 670 of FIG. 6. In block 810, if the DR system 150 is not running with more than one data-sharing member, no coordination is needed. If multiple members exist, in block 820 the recovery point extension module may write a YES value to the options file for all members. When the recovery jobs for the other members discover the options value has changed from WAIT to YES, those recovery job may resume execution to complete recovery on that member.

Figure 9:
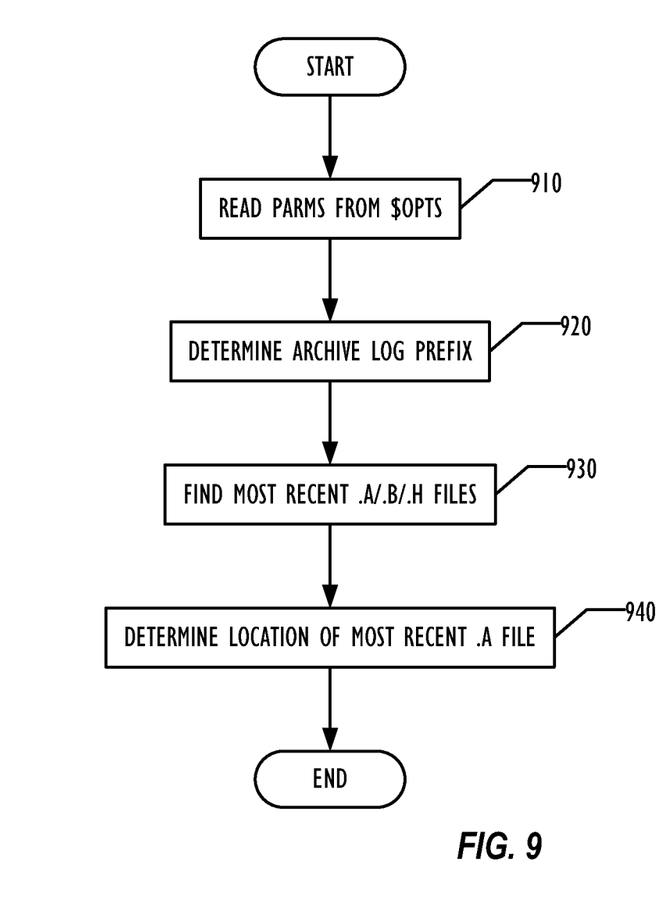

FIG. 9 is a flowchart illustrating a technique according to one embodiment for determining what files to process for recovery point extension, corresponding to block 630 of FIG. 6. In block 910, the recovery point extension module may read parameters from an options file that indicates the format of the filenames that may be processed. In block 920, a prefix of the filenames for archive logs may be determined.

In some embodiments, multiple types of archiving may be used, each of which may generate archive logs and other files with different prefixes or other characteristics. For example, in one embodiment, one of four types of archiving may be performed. In one type, designated herein as type 1, a single archive log is generated and kept onsite at the local site 100. In another type, designated herein as type 2, a dual archive log is generated and stored onsite, to allow for the possibility of corruption or other problems with the type 1 archive log. Types 3 and 4 are similar to types 1 and 2, respectively, creating additional duplicates of the type 1 and 2 archive logs that may be preserved offsite, for additional protection.

In block 930, the recovery point extension module may locate the most recent files that are available for recovery processing, based on the information gleaned in blocks 910 and 920. In one embodiment, those files are known as .A, .B, and .H files, based on a filename suffix that begins with A, B, or H. The .A files are archive log files, the .B files are BSDS files, and the .H files are history files associated with type 3 and 4 archive logging. In one embodiment, in addition to obtaining filename information, information about the storage media used by those files may be obtained in block 940.

Figure 10:
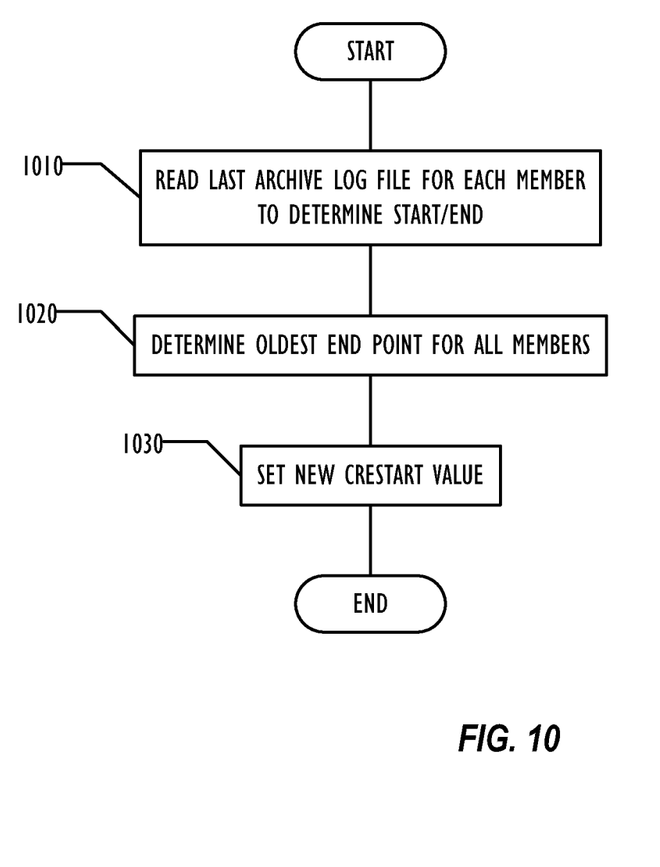

FIG. 10 is a flowchart that illustrates a technique for determining the extended recovery point according to one embodiment, corresponding to block 640 of FIG. 6. In block 1010, the recovery job may determine the most recent log file for each member of the data-sharing group to determine start and end times for the archive log. These start and end times may be expressed in a format determined by the DBMS vendor, typically one or both of an RBA value or an LRSN value. In block 1020, the oldest end value of the values determined in block 1010 may be determined and selected as a recovery point, to attempt to ensure logical consistency across all members. If recovery point were calculated that was later than the latest end value for some member, recovering to that recovery point would likely fail or produce a logically inconsistent database. A new conditional restart value may be set in block 1030 to the oldest end value selected in block 1020, which then becomes the extended recovery point.

Figure 11:
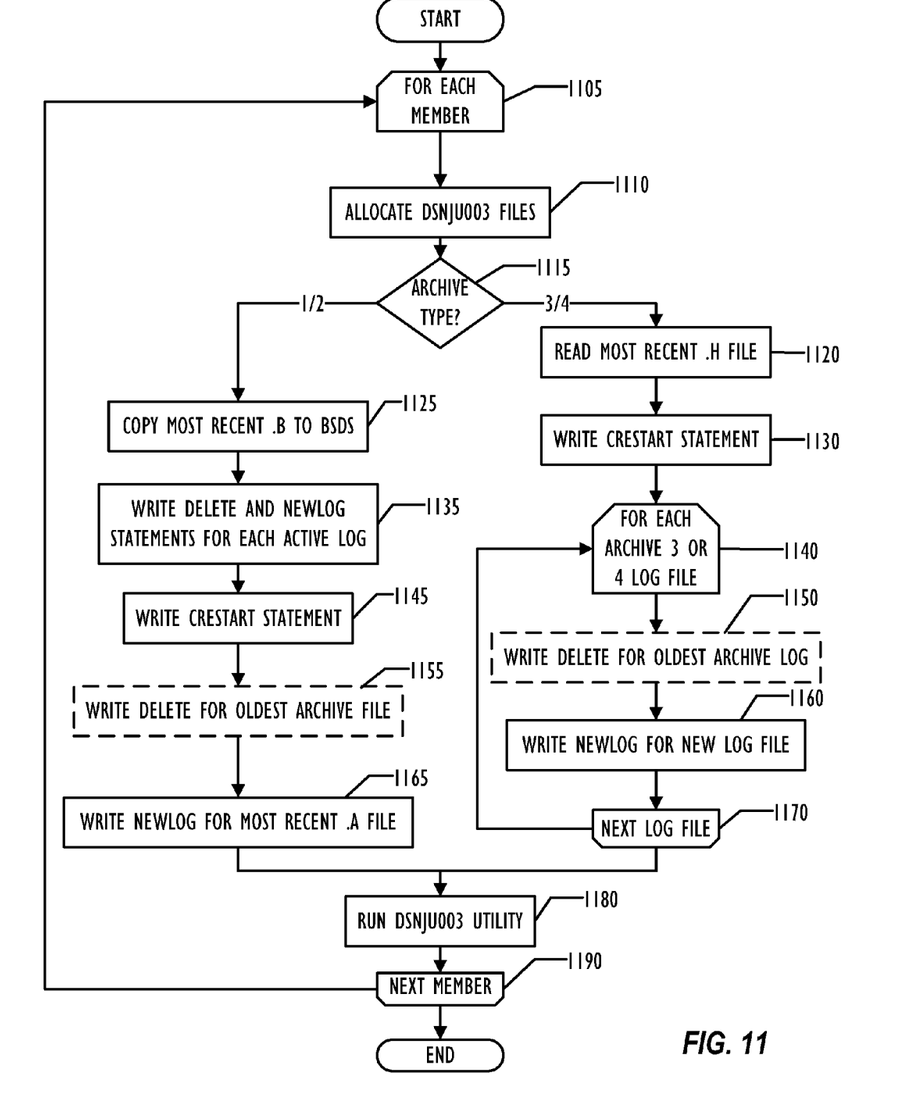

FIG. 11 is a flowchart that illustrates a technique for updating BSDS files to extend the recovery point according to one technique, corresponding to block 660 of FIG. 6. In block 1105, the recovery point extension module begins the processing for each member of the data-sharing group.

In one embodiment, the recovery point extension module may update the BSDS files directly. In another embodiment, illustrated in FIG. 11, the recovery point extension module may generate commands for execution by a DBMS utility, such as the IBM DSNJU003 utility, that performs the actual update of the BSDS files responsive to those commands. The commands generated by the recovery point extension module in this embodiment may be written to an input file for that utility, or passed to the utility in any way defined by the utility. Thus, in block 1110, the files used by the utility routine are allocated in this embodiment.

In block 1115, the archive type for the member being processed may be determined. In one embodiment, archive types 1 and 2 are processed in a first way, while archive types 3 and 4 are processed in a second way, as described below.

For archive types 1 and 2, the most recent .B file may be copied to the BSDS files for the current member in block 1125, replacing the existing BSDS files. In block 1135, DELETE and NEWLOG commands may be generated for each active archive log file, to delete the log dataset name from the BSDS files, then adding it. In some embodiments, the BSDS files may only allow for a predetermined number of log files, so this technique may ensure that there is room in the BSDS files for all of the active logs. In embodiments where there is no limit on the number of log files that may be recorded in the BSDS files, or where the recovery point extension module determines that the limit will not be exceeded, the DELETE commands may be omitted.

In block 1145, a CRESTART command is written to the utility input file, to set the conditional restart point of the database to the time determined in block 1030 of FIG. 10. In block 1155, a DELETE statement is generated to delete the oldest archive log file. As with the active log files above, in embodiments where deletion is not required to provide room for the archive logs to be added to the BSDS files, this block may be omitted. In block 1165, NEWLOG statements are generated to add the most recent archive log files to the BSDS files. If type 2 logging was determined in block 1115, blocks 1155 and 1165 may be repeated for the dual or secondary logs in one embodiment.

The DSNJU003 utility may be executed in block 1180, processing the commands generated above to perform the actual update to the BSDS files. In block 1190, the recovery point extension module may determine if there are any more members to process, repeating the blocks beginning at block 1105 for each member.

When block 1115 determines that the local site 100 was using type 3 or 4 archive logging, a different series of acts may be performed. In block 1120, the most recent .H file may be read to find additional archive logs at the DR site 150. In block 1130, a new conditional restart command may be written to the utility input file as determined by block 1030 of FIG. 10.

Blocks 1140-1170 may be performed for each archive type 3 or 4 log passed to the DR site 150 that was created after the recovery job was generated. As with the type 1 and 2 archive logs, in block 1150 a DELETE command may be generated to delete older archive logs from the BSDS files to ensure room to add the archive type 3 or 4 log files to the BSDS files in block 1160. In one embodiment, the archive type 3 and 4 log files may be added to the BSDS files as if they were archive type 1 or 2 log files.

After all type 3 and 4 archive logs have been processed for the member, the DSNJU003 utility may be executed in block 1180 to perform the actual updates to the BSDS files. Finally, as described above, block 1190 may determine whether any additional members are to be processed and repeat the acts described above for every member.

The techniques described above allow a DBA to pre-generate recovery jobs on a convenient schedule at the local site 100, then recover a database at a DR site 150, but continue to generate archive log files in the interim between recovery job generation and recovery job execution that can be incorporated into the recovery job, extending the recovery point closer to the time of the disruption that triggered the need or desire for recovery.

Various changes in the components as well as in the details of the illustrated operational method are possible without departing from the scope of the following claims. For instance, the illustrative systems of FIGS. 1-2 may be comprised of more than one computer communicatively coupled via a communication network, wherein the computers may be mainframe computers, minicomputers, workstations or any combination of these. Such a network may be composed of one or more local area networks, one or more wide area networks, or a combination of local and wide-area networks. In addition, the networks may employ any desired communication protocol and further may be "wired" or "wireless." In addition, acts in accordance with FIGS. 3-11 may be performed by a programmable control device executing instructions organized into one or more program modules. A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs"). Storage devices suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A system, comprising:
a first computing device at a first site, the first computing device including:
at least one processor, and
memory storing instructions that when executed at the first computing device cause the first computing device to perform operations including:
pre-generating a database recovery job including Job Control Language (JCL) for a first phase to configure a database management system of the database and JCL for a second phase to recover the data of the database;
transporting the database recovery job to a second site,
generating an archive log after the act of generating the recovery job, the recovery data comprising at least one database archive log generated after the act of generating the database recovery job, and
transporting the database archive log to the second site; and
a second computing device at the second site, the second computing device including:
at least one processor; and
memory storing instructions that, when executed at the second computing device cause the second computing device to perform operations including:
receiving the database recovery job,
receiving the archive log, and
executing the database recovery job to recover the database at the second site to an extended recovery point by modifying, during the first phase, a control file for the database to recognize the database archive log.

2. The system of claim 1, wherein the generating the recovery job comprises:

generating a first job corresponding to a first member of a data-sharing group of computer systems at the first site; and
generating a second job corresponding to a second member of the data-sharing group.

3. The system of claim 2,
wherein the act of generating a first job comprises:
generating instructions to extend a database recovery point to the extended recovery point, after execution of a first portion of the second job; and wherein the act of generating a second job comprises:
generating instructions to indicate execution of the first portion of the second job to the first job.

4. The system of claim 2,
wherein the act of generating a first job comprises:
generating instructions to extend a database recovery point determined during the act of generating the first job to the extended recovery point;
generating instructions to signal the second job to perform a second portion of the second job responsive to the act of extending a database recovery point; and
wherein the act of generating a second job comprises:
generating instructions to perform the second portion of the second job when signaled by the first job.

5. The system of claim 1, wherein the database is a DB2 database and the control file is a BootStrap data set (BSDS):
generating instructions to calculate a conditional restart point at the extended recovery point corresponding to the database archive log; and
generating instructions to update a bootstrap dataset to indicate the conditional restart point and the database archive log.

6. The method system of claim 1, wherein executing the second phase of the database recovery job occurs after executing the first phase and starting the database in maintenance mode.

7. The method system of claim 1, wherein generating the recovery job comprises:
generating instructions to determine a plurality of end points, each corresponding to an end point of a last archive log corresponding to each member of a data-sharing group;
generating instructions to determine an oldest end point of the plurality of end points; and
generating instructions to set a conditional restart point in the control file to the oldest end point.

8. The method system of claim 1, wherein the recovery job includes:
instructions to replace the control file a bootstrap dataset; and
instructions to modify a conditional restart point in the control file with a conditional restart point corresponding to the extended recovery point.

9. A method, comprising:
receiving, at a computer system of a recovery site, a pre-generated database recovery job to recover a database, the database recovery job being pre-generated on a periodic basis, the database recovery job including Job Control Language (JCL) for a first phase to configure a database management system of the database and JCL for a second phase to recover data of the database;
receiving, at the computer system, a database archive log generated after the pre-generated database recovery job; and executing the pre-generated database recovery job on the computer system to recover the database to a recovery point corresponding to the database archive log by modifying, during the first phase, a control file for the database to recognize the database archive log.

10. The method of claim 9, wherein the act of executing the pre-generated database recovery job is performed by a computer system of a first member of a data-sharing group.

11. The method of claim 9,
wherein the act of receiving a pre-generated database recovery job comprises: receiving a first pre-generated database recovery job configured for execution by a first member of a data-sharing group of computer systems; and
receiving a second pre-generated database recovery job configured for execution by a second member of a data-sharing group of computer systems; and
wherein the act of executing the pre-generated database recovery job comprises: extending a first recovery point determined during generation of the first pre-generated database recovery job to the recovery point corresponding to the database archive log by the first pre-generated database recovery job; and
recovering the database to the recovery point corresponding to the database archive log by the first pre-generated recovery job and the second pre-generated recovery job.

12. The method of claim 11, wherein the act of executing the pre-generated database recovery job further comprises:
coordinating the execution of the first pre-generated database recovery job on a first computer system of the first member of the data-sharing group and the execution of the second pre-generated database recovery job on a second computer system of the second member of the data-sharing group.

13. The method of claim 12, wherein the act of coordinating the execution of the first pre-generated database recovery job on a first computer system of the first member of the data-sharing group and the execution of the second pre-generated database recovery job on a second computer system of the second member of the data-sharing group comprises:
delaying extension of the first recovery point by the first pre-generated recovery job until the execution of a first portion of the second pre-generated recovery job; and
delaying execution of a second portion of the second pre-generated recovery job until extension of the first recovery point by the first pre-generated recovery job.

14. The method of claim 12, wherein the act of coordinating the execution of the first pre-generated database recovery job on a first computer system of the first member of the data-sharing group and the execution of the second pre-generated database recovery job on a second computer system of the second member of the data-sharing group comprises:
executing a first portion of the second pre-generated job to prepare the second member for extension of the first recovery point;
signaling to the first pre-generated recovery job by the second pre-generated job that the second member of the data-sharing group is ready for extension of the first recovery point by the first pre-generated recovery job;
signaling to the second pre-generated recovery job by the first pre-generated job that the first pre-generated recovery job has extended the first recovery point; and
executing a second portion of the second pre-generated job to recover the database on the second member of the data-sharing group.

15. The method of claim 11, wherein the act of extending a first recovery point determined during generation of the first pre-generated database recovery job to the recovery point corresponding to the database archive log by the first pre-generated database recovery job comprises:
determining a type of archiving performed for the database;
performing a first set of acts if the type of archiving is of a first type, comprising:
replacing the control file;
calculating the recovery point corresponding to the database archive log;
updating the control file with the recovery point corresponding to the database archive log; and
updating the control file with information corresponding to the database archive log; and
performing a second set of acts if the type of archiving is of a second type, comprising:
reading a history file;
calculating the recovery point corresponding to the database archive log;
updating the control file with the recovery point corresponding to the database archive log; and
updating the control file with information corresponding to the database archive log.

16. The method of claim 15, wherein the act of extending a first recovery point determined during generation of the first pre-generated database recovery job to the recovery point corresponding to the database archive log by the first pre-generated database recovery job further comprises:
deleting older archive logs from the control file.

17. A tangible computer-readable storage device with instructions for a programmable control device stored thereon wherein the instructions cause a programmable control device to perform the method of claim 9.

18. The method of claim 9, wherein modifying the control file includes:
determining the archive log is a first archive type;
replacing existing control file with a most recent database control file from the archive log; and
setting a conditional restart point to a time of an end point for the archive log file.

19. The method of claim 9, wherein the first phase executes when the database is stopped and the second phase executes after the database has been re-started in a maintenance mode.

20. A networked computer system comprising:
a plurality of computers communicatively coupled, at least one of the plurality of computers programmed to perform the method of claim 9.

21. A tangible computer-readable storage device with instructions for a programmable control device stored thereon wherein the instructions cause a programmable control device to perform the method of claim 9.

* * * * *

UNITED STATES PATENT AND TRADEMARK OFFICE
CERTIFICATE OF CORRECTION

PATENT NO. : 9,767,181 B2
APPLICATION NO. : 12/628155
DATED : September 19, 2017
INVENTOR(S) : James L. Whisenant Page 1 of 1

It is certified that error appears in the above-identified patent and that said Letters Patent is hereby corrected as shown below:

In the Claims

In Claim 5, delete Lines 3, 4, 5, 6, 7.

In Claim 6, Line 1, delete "The method system" and insert --The system--, therefor.

In Claim 7, Line 1, delete "The method system" and insert --The system--, therefor.

In Claim 8, Line 1, delete "The method system" and insert --The system--, therefor.

Signed and Sealed this
Tenth Day of October, 2017

Joseph Matal
*Performing the Functions and Duties of the*
*Under Secretary of Commerce for Intellectual Property and*
*Director of the United States Patent and Trademark Office*